United States Patent
Takano (10) Patent No.: US 12,249,802 B2
(45) Date of Patent: Mar. 11, 2025

(54) LASER DEVICE AND METHOD FOR OPERATING LASER DEVICE

(71) Applicant: NICHIA CORPORATION, Anan (JP)

(72) Inventor: Tetsushi Takano, Yokohama (JP)

(73) Assignee: Nichia Corporation, Anan (JP)

( * ) Notice: Subject to any disclaimer, the term of this patent is extended or adjusted under 35 U.S.C. 154(b) by 788 days.

(21) Appl. No.: 17/489,537

(22) Filed: Sep. 29, 2021

(65) Prior Publication Data

US 2022/0102931 A1     Mar. 31, 2022

(30) Foreign Application Priority Data

Sep. 30, 2020   (JP) ................................. 2020-165045

(51) Int. Cl.
*H01S 3/091*      (2006.01)
*H01S 3/08*      (2023.01)
(Continued)

(52) U.S. Cl.
CPC ...... *H01S 3/08059* (2013.01); *H01S 3/08013* (2013.01); *H01S 3/091* (2013.01);
(Continued)

(58) Field of Classification Search
CPC .. H01S 3/091; H01S 3/094038; H01S 3/1022; H01S 3/0816; H01S 3/0973; H01S 3/08045
See application file for complete search history.

(56) References Cited

U.S. PATENT DOCUMENTS

| 5,007,717 A | * | 4/1991 | Cutolo | ..................... G01J 11/00 250/208.2 |
| 5,097,471 A | * | 3/1992 | Negus | .................... H01S 3/1112 372/18 |

(Continued)

FOREIGN PATENT DOCUMENTS

| CA | 2750297 A1 | * | 7/2010 | ......... G02B 27/0927 |
| CN | 107565360 A | | 1/2018 | |

(Continued)

OTHER PUBLICATIONS

Great Britain Search Report in GB Patent Appl. Ser. No. 2113775.7, dated Jan. 28, 2022 (4 pages).
(Continued)

*Primary Examiner* — Joshua King
(74) *Attorney, Agent, or Firm* — Foley & Lardner LLP (57) ABSTRACT

A laser device includes: a traveling wave type resonator comprising a first mirror and a second mirror; and a laser medium disposed between the first mirror and the second mirror. The first mirror and the second mirror are disposed such that round-trip light that travels in round trips in the resonator has a focus inside the laser medium. The laser device is configured such that: excitation light incident on the resonator is superimposed on the round-trip light at the focus and narrowed to be thinner than the round-trip light, $Z_R \times \alpha < 0.5$ is satisfied, where $Z_R$ is a Rayleigh length of the excitation light and $\alpha$ is an absorption coefficient of the laser medium with respect to the excitation light, and a round-trip Gouy phase shift of the resonator has a value excluding $2\pi \times n/m$ where m is an integer of less than 15 and n is an integer of equal to or less than m.

13 Claims, 8 Drawing Sheets

(51) Int. Cl.
  *H01S 3/094* (2006.01)
  *H01S 3/0973* (2006.01)
  *H01S 3/081* (2006.01)

(52) U.S. Cl.
  CPC .......... *H01S 3/0973* (2013.01); *H01S 3/0816* (2013.01); *H01S 3/094038* (2013.01)

(56) References Cited

U.S. PATENT DOCUMENTS

| | | | |
|---|---|---|---|
| 6,603,778 | B1 | 8/2003 | Imasaka |
| 6,618,423 | B1 | 9/2003 | Dekorsy et al. |
| 8,345,717 | B2 | 1/2013 | Dekker et al. |
| 9,318,867 | B2 | 4/2016 | Pronin et al. |
| 9,520,693 | B2 | 12/2016 | Matsumoto |
| 10,283,928 | B2 | 5/2019 | Rothberg et al. |
| 10,763,634 | B2 * | 9/2020 | Katsuragawa ............ H01S 3/09 |
| 2004/0085658 | A1 * | 5/2004 | Henrich ................ H01S 3/1112 359/850 |
| 2005/0094684 | A1 | 5/2005 | Hermann et al. |
| 2007/0297464 | A1 * | 12/2007 | Adachi ................ H01S 3/1118 372/18 |
| 2009/0116516 | A1 * | 5/2009 | Kasamatsu ............ H01S 3/1118 372/18 |
| 2014/0002892 | A1 * | 1/2014 | Russbuldt ............ H01S 3/0092 359/328 |
| 2014/0321484 | A1 * | 10/2014 | Sierra ................... H01S 3/1121 372/18 |
| 2017/0199036 | A1 * | 7/2017 | Moxley, III ............ H01S 5/10 |
| 2017/0244215 | A1 | 8/2017 | Watanabe et al. |
| 2019/0086329 | A1 * | 3/2019 | Crosson ................ H01S 5/146 |

FOREIGN PATENT DOCUMENTS

| | | | | |
|---|---|---|---|---|
| CN | 108767642 | A * | 11/2018 | ............ H01S 3/086 |
| CN | 109742648 | A | 5/2019 | |
| JP | H10-133244 | A | 5/1998 | |
| JP | 2000-221549 | A | 8/2000 | |
| JP | 2003-500861 | A | 1/2003 | |
| JP | 2009-533847 | A | 9/2009 | |
| JP | 2014-531777 | A | 11/2014 | |
| JP | 2017-059683 | A | 3/2017 | |
| JP | 2020-502798 | A | 1/2020 | |
| WO | WO-9707575 | A1 * | 2/1997 | ............... H01S 3/08 |
| WO | WO-2008070890 | A1 * | 6/2008 | ............ G02F 1/353 |
| WO | WO-2012/157355 | A1 | 11/2012 | |
| WO | WO-2016/103483 | A1 | 6/2016 | |
| WO | WO-2018/092813 | A1 | 5/2018 | |
| WO | WO-2019064007 | A1 * | 4/2019 | ............. G02B 5/284 |

OTHER PUBLICATIONS

RP Photonics Software, Introduction to RP Resonator V4, https://www.rp-photonics.com/resonator.html.

RP Photonics Software, *New Editor Features: Syntax Highlighting, Parameter Help, Syntax Checking, Automatic Code Reformatting* (Jul. 13, 2017), https://www.rp-photonics.com/software_news_2017_07_13.html.

Screenshot and Transcript of Rüdiger Paschotta, *Introduction to the Resonator Design Software RP Resonator*, YouTube (Aug. 29, 2018), https://www.youtube.com/watch?v=6sn0w-Uky4w.

"Optimum Design of End-Pumped Solid-State Lasers", G. Shayeganrad, Solid State Laser, Chapter 1, pp. 3-26, Edited by Amin Al-Khursan, In Tech Open.

* cited by examiner

LASER DEVICE AND METHOD FOR OPERATING LASER DEVICE

CROSS-REFERENCE TO RELATED APPLICATION

This application claims priority to Japanese Patent Application No. 2020-165045, filed on Sep. 30, 2020, the entire contents of which are hereby incorporated by reference.

BACKGROUND

The present invention relates to a laser device and a method for operating a laser device.

High power lasers having a single longitudinal mode and a single transverse mode play an important role in quantum information processing, precision spectroscopy, and the like. Lasers that can oscillate in a single mode include a solid-state laser. The solid-state laser is a laser formed of a plurality of mirrors and a laser medium (a solid crystal doped with a transition element ion). In order to increase output power of the solid-state laser, it is important to condense excitation light into the laser medium (for example, a titanium-sapphire crystal) and efficiently convert the light absorbed by the crystal into laser output light.

In order to increase slope efficiency of a rod type solid-state laser, it is important to optimize the value of "$Z_R \times \alpha$" acquired by multiplying a Rayleigh length $Z_R$ of excitation light and an absorption coefficient $\alpha$ of a laser medium (crystal) with respect to the excitation light. The slope efficiency is an increase amount (a derivative value) of output light with respect to an increase in excitation light output. The Rayleigh length $Z_R$ is a distance to a position in which a beam cross-sectional area is twice the beam cross-sectional area at a focus. The Rayleigh length $Z_R$ is represented as $Z_R = n\pi w^2/\lambda$ by using a beam radius w at the focus, a wavelength $\lambda$, and a refractive index n of the laser crystal. While light propagates for a distance of the Rayleigh length $Z_R$, the beam radius expands by $\sqrt{2}$ times. When the beam radius of the excitation light spreads, the excitation light cannot be efficiently converted into the laser output light. By numerical analysis, when $\alpha \times L > 1.89$ is satisfied with respect to a laser crystal length L, the value of "$Z_R \times \alpha$" is known to have an optimal value greater than ½ (for example, see "Optimum Design of End-Pumped Solid-State Lasers", G. Shaveganrad, SOLID STATE LASER, Chapter 1, page 12, Edited by Amin Al-Khursan, IntechOpen).

For performing pulse oscillation, a laser resonator has been proposed in which a resonator is formed of a plurality of mirrors, and a laser medium is disposed in a light path other than a light path having a beam thinly that is narrowed in the resonator, to prevent light damage to the resonator and maintain single transverse mode oscillation (for example, see WO 2018/092813 A1). When continuous light oscillation is performed, a method for disposing a laser medium in a thinly narrowed light path is generally used.

SUMMARY

When forming a solid-state laser, in addition to dispersion of the beam radius of the excitation light described above, a multi-mode beam may be generated due to absorption of the excitation light. A spatial temperature distribution occurs in the crystal by the absorption of the excitation light, resulting in a refractive index distribution. The refractive index distribution affects the propagation mode, changes the configuration of a resonator, and causes a transverse mode of output light to be a multi-mode.

An object of the present invention is to provide a laser device that maintains a single transverse mode and has improved light conversion efficiency.

According to one aspect of the present invention, a laser device includes a resonator of a traveling wave type including a first mirror and a second mirror, and a laser medium disposed between the first mirror and the second mirror, where the first mirror and the second mirror are disposed such that round-trip light that travels in round trips in the resonator comes into a focus inside the laser medium, excitation light incident on the resonator is superimposed on the round-trip light at the focus and narrowed to be thinner than the round-trip light, $Z_R \times \alpha < 0.5$ is satisfied, where a Rayleigh length of the excitation light is $Z_R$ and an absorption coefficient of the laser medium with respect to the excitation light is $\alpha$, and a round-trip Gouy phase shift of the resonator has a value excluding $2\pi \times n/m$, where m is an integer of less than 15 and n is an integer of equal to or less than m.

According to certain embodiments, a laser device that maintains a single transverse mode and has improved light conversion efficiency can be provided.

DETAILED DESCRIPTION

In an embodiment, a laser medium is irradiated at a higher excitation light density than that of a titanium sapphire laser being a typical solid-state laser, and light conversion efficiency of approximately 50% is achieved in a single transverse mode and a transverse mode in which a fundamental mode is maintained at equal to or greater than 90%. In one preferable example, a longitudinal mode is also set as a single mode by applying injection synchronization and controlling a resonator length of a resonator constituting a laser device to be integer times a wavelength of seed light to be injected. Thus, a single longitudinal mode and a single transverse mode are achieved. When the injection synchronization is not used, a split of light can also be hindered by disposing an isolator at an appropriate location on a light path in the resonator.

In order to achieve a single mode and high light conversion efficiency, the resonator is configured to be disposed such that $Z_R \times \alpha < 0.5$, and excitation light is thinly narrowed in the laser medium and superimposed on round-trip light. Here, $Z_R$ is a Rayleigh length of the excitation light, and $\alpha$ is an absorption coefficient of the laser medium with respect to the excitation light. The configuration and operation of the laser device according to the embodiment will be described in detail below with reference to the drawings.

Figure 1:
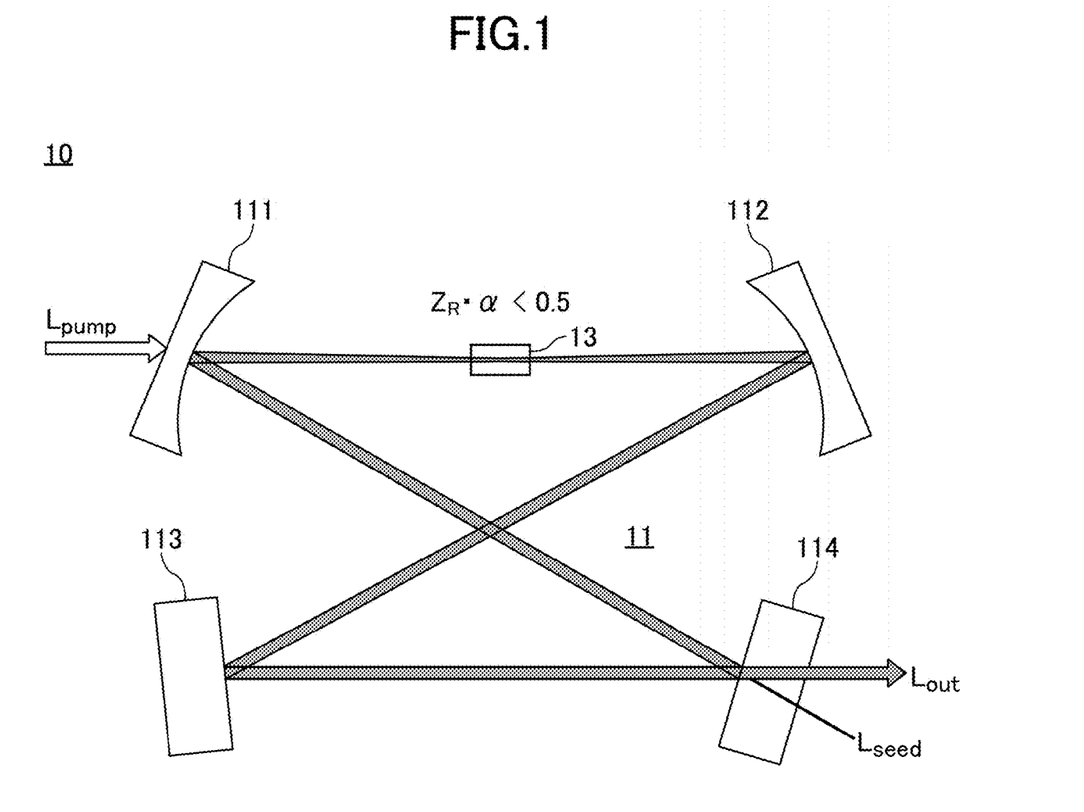
FIG. 1 is a schematic diagram of a laser device according to one embodiment.

FIG. 1 is a schematic diagram of a laser device 10 according to the embodiment. The laser device 10 includes a traveling wave type resonator 11 formed of a first mirror 111, a second mirror 112, a mirror 113, and a mirror 114, and a laser medium 13 disposed between the first mirror 111 and the second mirror 112. In the example, the first mirror 111 and the second mirror 112 are each a recessed mirror, and the mirror 113 and the mirror 114 are each a planar mirror.

A high reflection film having high reflectivity with respect to a wavelength of round-trip light may be formed on a reflecting surface of the first mirror 111 and the second mirror 112, and a reflecting surface of the mirror 113. A low reflection film with respect to a wavelength of excitation light may be formed on both surfaces of the mirror 111. A low reflection coating may be applied to a light incident surface of the mirror 114. The light incident surface of the mirror 114 is a surface on a side opposite to the reflecting surface.

The resonator 11 formed of the plurality of mirrors is a bow-tie type resonator in the example, and the light travels in round trips in a single direction. The resonator 11 may be disposed in any way when the resonator 11 is a traveling wave type resonator, i.e., a ring resonator that does not generate a standing wave. The reason for using a traveling wave type resonator 11 is that light and shade of the light are periodically generated in a laser medium in a standing wave resonator, induced emission is saturated at a position having strong light, and induced emission is reduced at a position having weak light, and thus light conversion efficiency decreases (spatial hole burning). In the embodiment, the resonator 11 is configured with a traveling wave type arrangement due to highly efficient laser oscillation.

The first mirror 111 and the second mirror 112 are disposed such that the round-trip light that travels in round trips in the resonator 11 (illustrated by a gray line in the drawing) has a focus inside the laser medium 13. A recessed surface of the first mirror 111 and a recessed surface of the second mirror 112 cause the light that travels in round trips in the resonator 11 to have a focus or a beam waist between the first mirror 111 and the second mirror 112.

For example, the first mirror 111 and the second mirror 112 are disposed at a position separated slightly further from a radius of curvature of the recessed surfaces thereof, and the laser medium 13 is disposed between the first mirror 111 and the second mirror 112. Thus, the round-trip light has a focus inside the laser medium 13. Excitation light $L_{pump}$ is superimposed on the focus of the round-trip light.

In the example in FIG. 1, the excitation light $L_{pump}$ is incident on the resonator 11 from the first mirror 111, and irradiates the laser medium 13. The light naturally emitted from the laser medium 13 travels in round trips in the order of the second mirror 112, the mirror 113, the mirror 114, the first mirror 111, and the second mirror 112, and is amplified by the laser medium 13 in each round. The excitation light $L_{pump}$ superimposed on the focus of the round-trip light and the round-trip light are further thinly narrowed by a thermal lens generated in a refractive index distribution that occurs in the laser medium 13 by light absorption as power of the excitation light is increased.

In order to irradiate the laser medium 13 with the thinly narrowed and highly dense excitation light and efficiently cause induced emission in the laser medium 13, the product "$Z_R \times \alpha$" of the Rayleigh length $Z_R$ of the excitation light and the absorption coefficient $\alpha$ of the laser medium 13 with respect to the excitation light is designed to be less than 0.5. When the Rayleigh length $Z_R$ is short, the spread of a beam radius is also fast, but in the embodiment, by using the thermal lens formed in the laser medium 13 by the absorption of the excitation light itself, a state in which the excitation light is thinly narrowed inside the laser medium 13 is maintained. As described above, the thermal lens is formed in the refractive index distribution generated by absorption of the thinly narrowed and highly dense excitation light by the laser medium 13. It is considered that the refractive index distribution acts as a protruding lens for the excitation light that is incident from a direction of the first mirror 111 and superimposed on the focus of the round-trip light, and has an effect of reducing the spread of a beam radius of the excitation light.

In the laser device 10, a longitudinal mode may be controlled by the injection synchronization. In the configuration example in FIG. 1, seed light $L_{seed}$ is injected from the mirror 114. A resonator length of the resonator 11, i.e., the length of a path that makes a round in the resonator 11, is adjusted to be integer times a wavelength of the seed light. Accordingly, a resonant frequency of the resonator 11 or a longitudinal mode of laser output light $L_{out}$ is locked at a frequency of the seed light. When injection synchronization is not used, splitting of the round-trip light can be hindered by inserting an isolator in an appropriate position on the light path in the resonator 11.

Figure 2:
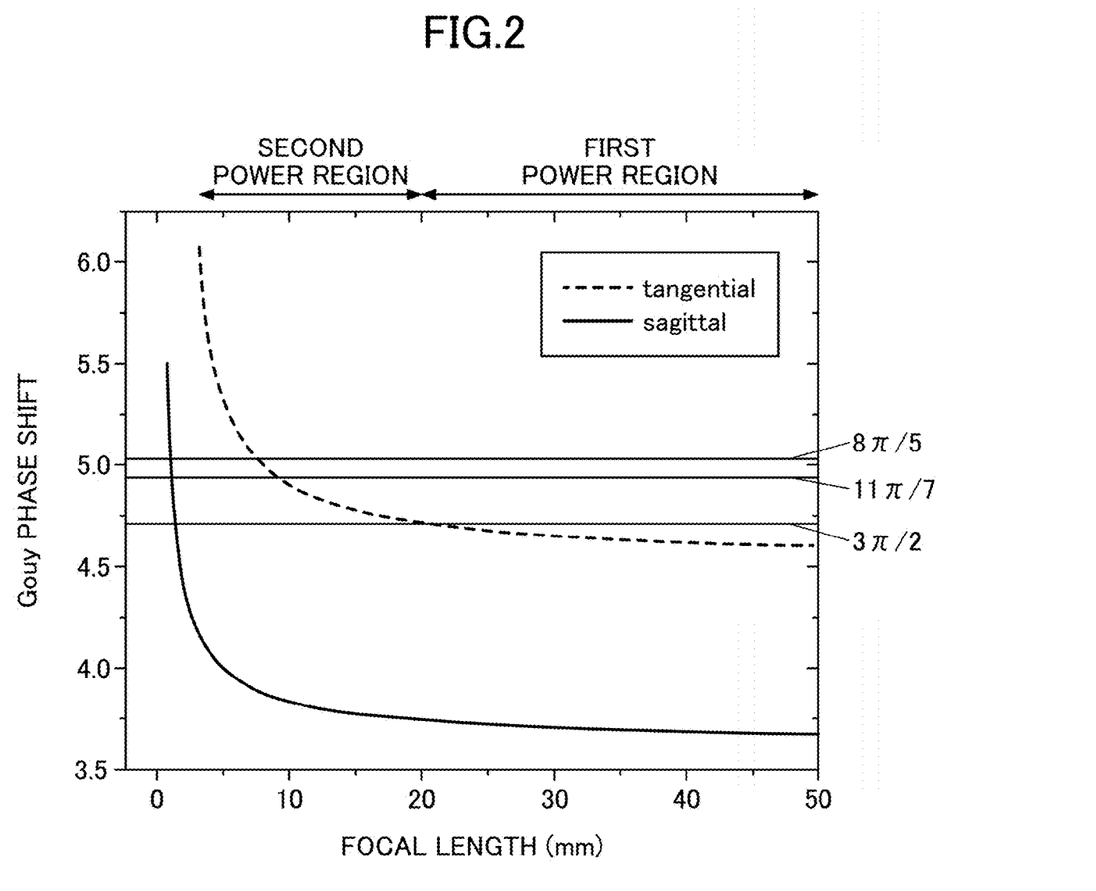
FIG. 2 is a diagram illustrating a relationship between a focal length of a thermal lens and a round-trip Gouy phase shift of a resonator.

FIG. 2 illustrates a relationship between a focal length of the thermal lens formed in the laser medium 13 and a round-trip Gouy phase shift ($\theta$) of the resonator 11. The round-trip Gouy phase shift is a Gouy phase shift that occurs when completing a round in the resonator. A solid line indicates a Gouy phase shift $\theta s$ of a sagittal component, and a dashed line indicates a Gouy phase shift $\theta t$ of a tangential component. When $\theta = 2\pi \times n/m$ (where m is an integer less than 15 and n is an integer equal to or less than m) is satisfied, both of an m-th mode and a fundamental mode resonate in the resonator to become a transverse multi-mode. In the diagram, focal lengths corresponding to $3\pi/2$, $11\pi/7$, and $8\pi/5$ are indicated by intersections of a curved line and a straight line. As described below, it is confirmed that a multi-mode occurs at excitation light power considered to correspond to the intersection.

In the calculation in FIG. 2, a light path length between the first mirror 111 and the second mirror 112 is set to 131.2 mm. This is the sum of a spatial light path of 96 mm and a crystal length of 35.2 mm. It is assumed that the incident surface of the crystal, i.e., the laser medium 13 is configured to be disposed at a position 51 mm from the first mirror 111. In a model in which one thermal lens is generated near a focus of the laser medium 13 (assumed to be at a position of 5 mm from the incident surface of the laser medium), the round-trip Gouy phase shift of the resonator 11 ("$\theta t, s$" by combining $\theta t$ and $\theta s$) is calculated.

The round-trip Gouy phase shift θt, s is given as θt, s=arccos ((A+D)/2) when a ray matrix (or an ABCD matrix) corresponding to one round in the resonator 11 is Equation 1 below.

$$\begin{bmatrix} A & B \\ C & D \end{bmatrix}_{t,s} \quad \text{Equation 1}$$

Here, θt represents a tangential component, θs represents a sagittal component, and when B is positive, a value in a range of 0<θt, s<π is taken, and when B is negative, a value in a range of π<θt, s<2π is taken.

The ray matrix of the resonator 11 is calculated as a product of each element. A ray matrix S(L) when propagating through a space having the length L is represented as Equation 2 below.

$$S(L) = \begin{bmatrix} 1 & L \\ 0 & 1 \end{bmatrix} \quad \text{Equation 2}$$

A ray matrix Mt, s(f) of the recessed mirror having a radius of curvature r and an incident angle ç is the tangential component and the sagittal component, and is represented as Equation 3 below.

$$M_t(r) = \begin{bmatrix} 1 & 0 \\ -2/r\cos\phi & 1 \end{bmatrix} \quad \text{Equation 3}$$

$$M_s(r) = \begin{bmatrix} 1 & 0 \\ -2\cos\phi/r & 1 \end{bmatrix}$$

A ray matrix L(f) of the lens having a focal length f is represented as Equation 4 below.

$$L(f) = \begin{bmatrix} 1 & 0 \\ -1/f & 1 \end{bmatrix} \quad \text{Equation 4}$$

By multiplying these ray matrices in the order of a waveguide, a ray matrix of a path of interest is calculated. In other words, when it is assumed that the radius of curvature r of the first mirror 111 and the radius of curvature r of the second mirror 112 are the same, and a light path length between the first mirror 111 and the thermal lens formed in the crystal (the laser medium 13) is L1, a light path length from the thermal lens to the second mirror 112 is L2, and the other light path length is L3 is calculated using Equation 5 below.

$$\begin{bmatrix} A & B \\ C & D \end{bmatrix}_{t,s} = M_{t,s}(r)S(L_1)L(f)S(L_2)M_{t,s}(r)S(L_3) \quad \text{Equation 5}$$

The round-trip Gouy phase shift θ represents the difference in phase of the light that occurs when a plane wave and a Gaussian beam make a round in the resonator. The difference in phase change is represented by m×θ when a 0-th mode (the Gaussian beam) and an m-th transverse mode make a round in the light resonator. Therefore, when θ=2π× n/m (where m is an integer less than 15 and n is an integer equal to or less than m) is satisfied, the amount of a round-trip phase change between the 0-th mode and the m-th mode is integer times 2π, and both resonate in the resonator, and thus multi-mode oscillation occurs. When the excitation light is the Gaussian beam, greater m of the round-trip light causes poorer spatial overlapping, which is thought to hinder oscillation. In the example, a multi-mode considered to be 11π/7 was observed.

Stronger excitation light power irradiating the laser medium 13 causes a steeper refractive index distribution and a shorter focal length f of the thermal lens. In the example, an increase in slope efficiency was observed when θt of the tangential component was considered to be shorter than a focal length of 3π/2 (approximately 20 mm).

A condition in which a resonant mode is present in both the sagittal component and the tangential component in a range of equal to or less than 20 mm of the focal length f is a range from 3 mm to 20 mm. Within such a range, an increase in slope efficiency and the single transverse mode are both possible with respect to a focal length excluding θt, s=2π×n/m.

In order to achieve the focal length f in the range, θt is set closer to 3π/2 by gradually increasing the excitation light power. In the example in FIG. 2, when f is approximately 20 mm, θt is 3π/2. It is considered that, at this point, the transverse mode is degenerated and multi-mode oscillation occurs.

Subsequently, θt of the tangential component is set far from 3π/2 by further increasing the excitation light power. The focal length of the thermal lens at this time is in a range from 6 mm to less than 13 mm.

Multi-mode operation of the resonator may start again at a point at which θt=2π×n/m (m>3) when the excitation light power is further increased from a point at which θt reaches 3π/2 and θt is then set far from 3π/2 in order to reduce diffusion of the excitation light and increase the efficiency of light absorption. However, an order of the light that resonates in the resonator at this time is higher, and thus the percentage at which the multi-mode occurs is lower than when θt=3π/2, and the transverse mode can recover by shifting a focal length of the thermal lens by slightly changing excitation light power, or by controlling a temperature of the laser medium as described below. Recovery of the transverse mode will be described below with reference to FIG. 5.

By controlling the power of the excitation light incident on the resonator 11 as described above, diffusion of the excitation light can be reduced by the effect of the thermal lens, the slope efficiency can be increased, and the laser device 10 having higher output power than that of a conventional laser device can be achieved.

Figure 3:
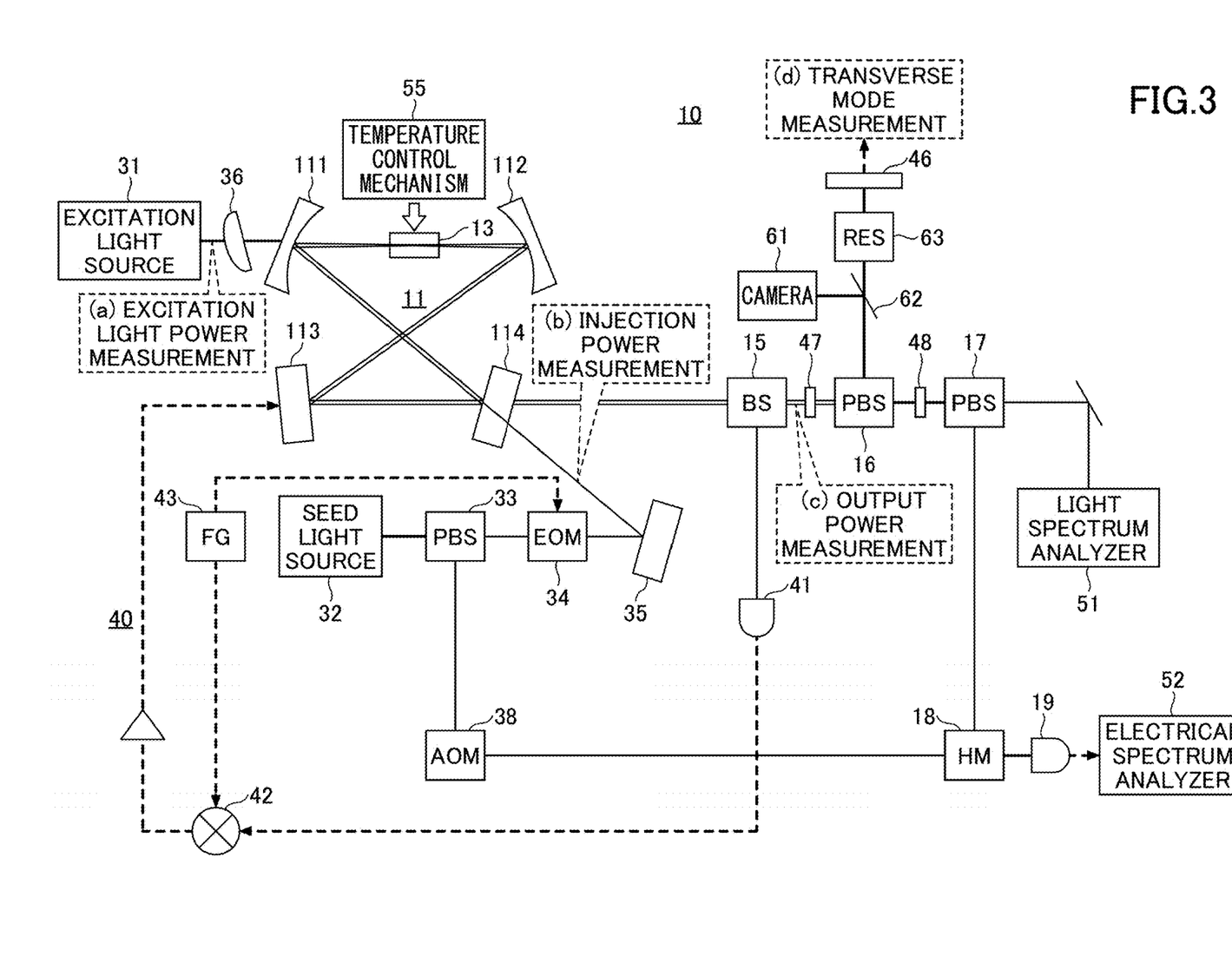
FIG. 3 is a diagram illustrating a configuration example of the laser device according to the embodiment along with a measurement setup.

FIG. 3 is a diagram illustrating a configuration example of the laser device 10 along with a measurement setup. As described with reference to FIG. 1, the laser device 10 includes the resonator 11, and the laser medium 13 disposed in the resonator 11. The resonator 11 is the traveling wave type resonator formed of the first mirror 111, the second mirror 112, the mirror 113, and the mirror 114. The laser medium 13 is disposed between the first mirror 111 and the second mirror 112 that are each circular and have a recessed surface.

As an example, a radius of curvature of the recessed surface of the first mirror 111 and the second mirror 112 is 100 mm, and a distance between the first mirror 111 and the second mirror 112 is 116 mm. As the laser medium 13, a titanium-sapphire crystal having an effective length of L=20 mm in a light axis direction from an incident surface to an emission surface is disposed between the first mirror 111 and the second mirror 112. As used herein, the "effective length" refers to a length of the light that passes through the laser medium 13, and is determined by a physical length, a refractive index, a wavelength, and the like of the laser medium 13. A diameter of the incident surface and the emission surface of the titanium sapphire crystal is 5 mm. The incident surface of the laser medium 13 is located at a position of 51 mm from the first mirror 111. The beam radius of incident light is narrowed to approximately 15 μm by the recessed surface of the first mirror 111.

The laser device 10 may include a temperature control mechanism 55 configured to control a temperature of the laser medium 13. The temperature control mechanism 55 may include a holder that holds the laser medium 13, and a temperature adjuster that adjusts a temperature of the holder. Because it is difficult to directly change the temperature of the laser medium 13, for example, the temperature of the laser medium 13 is controlled by changing the temperature of the holder that holds the laser medium 13. The effect of the thermal lens generated in the laser medium 13 can be adjusted by changing the temperature of the holder that holds the laser medium 13. As described below, the temperature control mechanism 55 can adjust influence of the effect of the thermal lens, and cause recovery of a multi-mode of the round-trip light that passes through the laser medium 13.

The effect of the thermal lens is an effect of propagating the thinly narrowed excitation light through the inside of the laser medium 13 while the excitation light remains thinly narrowed. Because the thermal lens generated inside the laser medium 13 by absorption of the excitation light by the laser medium 13 guides a wave while reducing diffusion of the excitation light, the effect of the thermal lens may be referred to as a "self-guiding effect" or a "self-convergent effect".

The length L3 from the second mirror 112 to the first mirror 111 through the mirror 113 and the mirror 114 is 395 mm in the configuration example. The round-trip light is incident on the first mirror 111 from the mirror 114 at an incident angle of 18 degrees, and is reflected by the first mirror 111 and condensed into the laser medium 13. In FIG. 3, a solid line and a double line that connect elements represent a light path, and the dotted line arrow indicates an electrical signal path.

The laser device 10 may include an excitation light source 31, or the excitation light may be incident on the resonator 11 from the outside through an optical fiber and the like. In the example, the excitation light is light having a wavelength of 532 nm that is a second harmonic of laser of 1064 nm. The resonator 11 is designed such that the Rayleigh length $Z_R$ of the excitation light incident on the laser medium 13 is 2.2 mm, the effective length L of the laser medium 13 with respect to the excitation light is 20 mm, and the absorption coefficient α is 1.8 cm$^{-1}$. The value of "L×α" is 3.6, which exceeds 1.89. The value of "$Z_R$×α" is 0.396, which is less than 0.5.

The power of the excitation light is controlled such that the round-trip Gouy phase shift that varies with the focal length f of the thermal lens formed inside the laser medium 13 satisfies θt, s≠2π×n/m. As described above, the power of the excitation light is increased until θt of the resonator 11 reaches 3π/2, and subsequently, the excitation light power is further increased so as to set θt to a level greater than 3π/2. When the excitation light source 31 is used, the excitation light power may be monitored on an emission side of the excitation light source 31 (a measurement (a)).

A lens 36 may be disposed between the excitation light source 31 and the first mirror 111. The lens 36 causes the excitation light to be incident on the resonator such that the excitation light is superimposed on the round-trip light at the focus in the laser medium 13. By adjusting the inclination of the lens 36, an aberration in a range of approximately 1 to 3 mm may be provided to at least one of a longitudinal direction and a transverse direction.

The laser device 10 may include a seed light source 32, or may be configured such that a seed light from the outside enters the resonator 11 through an optical fiber and the like. As the seed light source 32, for example, a continuous wave external resonator-type semiconductor laser having low power but a stable wavelength of 780 nm can be used.

The seed light is incident as injection synchronization light on the resonator 11 from the mirror 114. In the example in FIG. 3, a particular polarization component (for example, a TE component) included in the seed light output from the seed light source 32 is transmitted through a polarization beam splitter (labeled as "PBS" in the diagram) 33 and incident on the mirror 114 via an electro-optic modulator (EOM) 34 and a mirror 35. Injection power of the seed light may be measured on an incident side of the mirror 114 (a measurement (b)).

A longitudinal mode adjustment circuit 40 that feeds back the output power of the resonator 11 to a resonator length may be provided. Some of the output of the resonator 11 is split by a beam splitter (labeled as "BS" in the diagram) 15 and is detected by a photodiode 41. For example, the mirror 113 is configured such that a position of the mirror 113 can be adjusted by an actuator or the like, and a position of the mirror 113 is adjusted such that a resonator length is integer times a wavelength of the seed light, based on the output of the photodiode 41. With this adjustment, the single longitudinal mode is maintained.

A phase of the seed light may be modulated by generating a frequency in a range of 10 MHz to 20 MHz by a frequency generator (FG) 43 and inputting the frequency to the electro-optic modulator 34. In a multiplier 42, a high-frequency component included in a signal detected by the photodiode 41 may be synchronously detected at a modulation frequency. The result of the synchronous detection is fed back to an adjustment of the position of the mirror 113, and thus the resonant frequency of the resonator 11 is locked at the frequency of the seed light.

Alight isolator may be inserted between the seed light source 32 and the polarization beam splitter 33 or between the electro-optic modulator 34 and the mirror 35 such that light reversing in the light resonator 11 does not return to the electro-optic modulator 34 and the seed light source 32. Further, for protection of the output light from the resonator 11, the light isolator may also be inserted between the beam splitter 15 and a waveplate 47. Further, for correction of an aberration of the output light, a cylindrical lens pair may be inserted between the beam splitter 15 and the waveplate 47.

The output light of the resonator 11 is output through the beam splitter 15. The output light is an output of the laser device 10. The power of the output light may be monitored (a measurement (c)). In a measurement setup illustrated in FIG. 3, in order to evaluate a characteristic of the laser output light, light transmitted through the beam splitter 15 is guided to a polarization beam splitter 16 via a half waveplate 47, and the laser output light is separated into two polarized waves by the polarization beam splitter 16. One polarization component (for example, the TE component) is incident on a light resonator (labeled as "RES" in the diagram) 63 that sweeps the resonator length, the transmitted light is detected by a photodiode 46, distribution of the transverse modes is detected by using that transverse modes for resonance are different by each resonator length, and a ratio of the fundamental mode is measured (a transverse mode measurement (d)).

A portion of the light incident on the light resonator 63 is split by a half mirror 62, and a beam shape is observed by a camera 61. The other polarization component transmitted through the polarization beam splitter 16 is guided to a polarization beam splitter 17 via a half waveplate 48, and is separated into two polarization components by the polarization beam splitter 17. The polarization component (for example, the TE component) extracted by the polarization beam splitter 17 is spectrally observed by a light spectrum analyzer 51. A TM component extracted by the polarization beam splitter 17 is guided to a half mirror (HM) 18 and combined with a TM component of the seed light. The combined light is detected by a photodiode 19, and a beat frequency is measured by an electrical spectrum analyzer 52.

The transverse mode measurement (d), a spectral observation performed by the light spectrum analyzer 51, and a beat measurement performed by the electrical spectrum analyzer 52, and further the optical system to the measurement sites are for evaluating characteristics of the laser output light, and are not included in the laser device 10.

Figure 4:
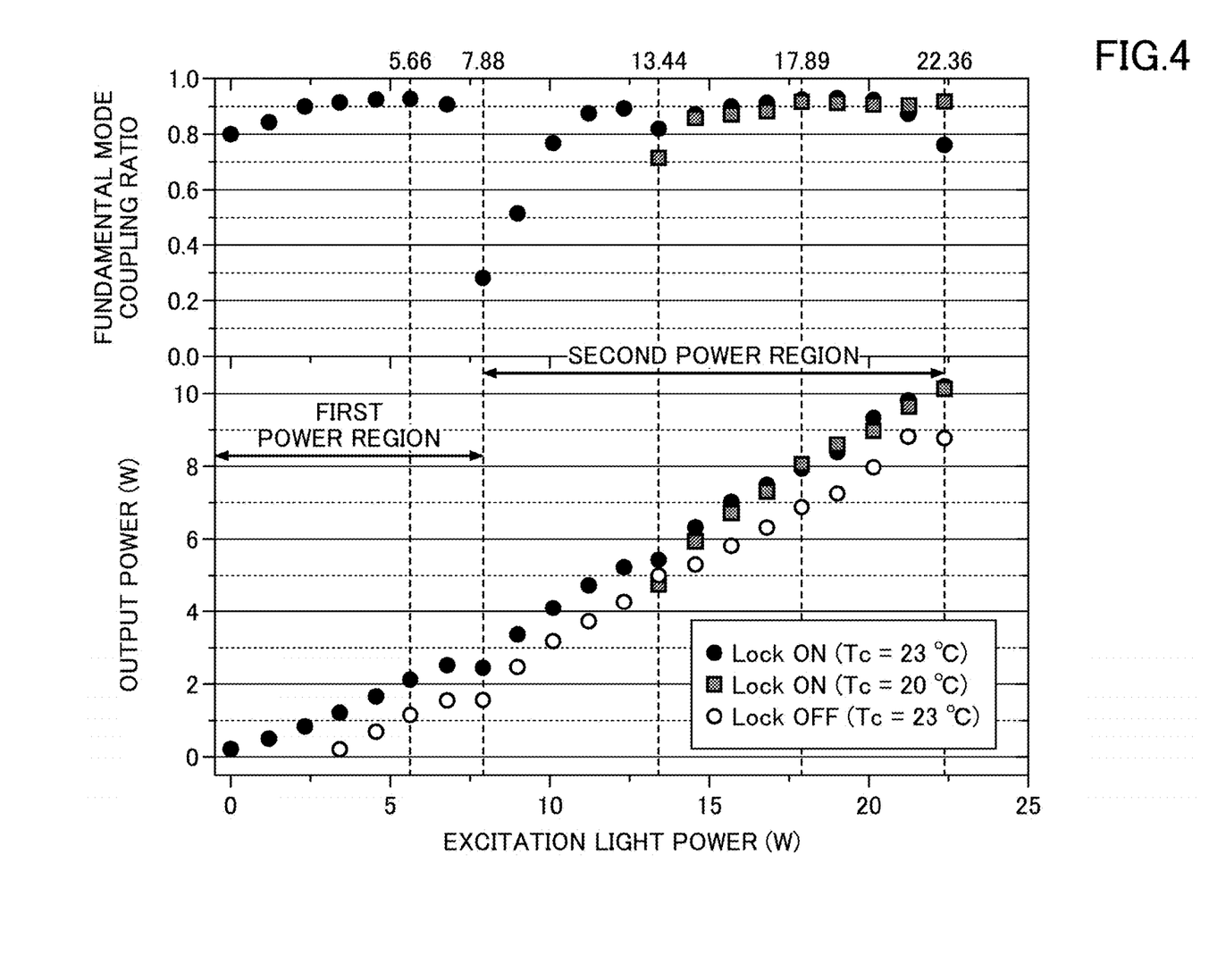
FIG. 4 is a diagram illustrating a relationship between excitation light power and laser output power, and a relationship between the excitation light power and a fundamental mode coupling ratio.

FIG. 4 is a diagram illustrating a relationship between excitation light power and a laser characteristic. The bottom half in FIG. 4 illustrates a relationship between the excitation light power and laser output light power. The top half in FIG. 4 illustrates a relationship between the excitation light power and a fundamental mode coupling ratio.

The fundamental mode is a TEM00 mode of a Gaussian distribution type intensity distribution in which the intensity is strongest at a central portion of a beam.

The excitation light power is measured in the excitation light power measurement (a) in FIG. 3. The laser output power is measured in the output power measurement (c) in FIG. 3. The coupling ratio to the fundamental mode is represented by a percentage of the fundamental mode included in the transverse mode, and is obtained in the transverse mode measurement (d) of the laser output light in FIG. 3.

A black dot is data when the temperature of the holder that holds the laser medium 13 is set to 23° C. and injection synchronization, i.e., injection of the seed light is turned on. A gray square is data when the temperature of the holder that holds the laser medium 13 is set to 20° C. and the injection synchronization is turned on. A white dot is data when the temperature of the holder that holds the laser medium 13 is set to 23° C. and the injection synchronization is turned off. When the injection synchronization is turned off, the light is emitted in two directions, and thus a value of the two combined light beams is presented.

As the power of the excitation light is increased from approximately 0 W to 8 W at a holder temperature of 23° C., the laser output power increases in a nearly linear relationship. This tendency is the same regardless of presence or absence of the injection synchronization, but the output power is higher when the injection synchronization is performed.

As the excitation light power is further increased, the laser output power increases in a linear relationship. The slope efficiency is different between a first power region having low excitation light power and a second power region having high excitation light power.

The slope efficiency represents a ratio of a laser output power increase with respect to an excitation light power increase, that is, correlates with the light conversion efficiency of the laser device 10. When the injection synchronization is turned on, the slope efficiency in the first power region is equal to or greater than 30% and less than 40%, and an inclination when linearly fitting is approximately 38%. On the other hand, the slope efficiency in the second power region is in a range from 45% to 60%, and an inclination when linearly fitting exceeds 50%. A linear increasing trend of the laser output light is the same regardless of presence or absence of the injection synchronization, but the laser output power with respect to the same excitation light power is higher when injection synchronization is turned on. It can be seen that the slope efficiency represented by a ratio of an output light power increment with respect to an excitation light power increment is higher in the second power region in which the excitation light power is higher than a predetermined level (8 W in the example) than in the first power region in which the excitation light power is equal to or less than the predetermined level.

When laser oscillation occurs under the condition that the holder temperature is 20° C. in the second power region, the laser light having the same power as that when the holder temperature is 23° C. is output, and the same slope efficiency is achieved.

A typical commercial titanium sapphire laser without the injection synchronization obtains only an output of approximately 5 W at the excitation light power of 18 W. In contrast, in the configuration of the embodiment, when the injection synchronization is performed, laser output power of equal to or greater than 8 W is obtained at the excitation light power of 18 W. It can be seen that the output power is improved by 30 to 60% as compared to a conventional titanium sapphire laser.

Subsequently, with reference to the coupling ratio to the fundamental mode, a transverse mode equal to or greater than 80% is obtained in the first power region. A transverse mode equal to or greater than 90% is also obtained at power greater than 13 W in the second power region. However, the fundamental mode coupling ratio suddenly becomes worse at a boundary between the first power region and the second power region. The point at which the fundamental mode coupling ratio suddenly drops matches a change point at which the inclination of the slope changes. The excitation light power at the change point is exactly 7.88 W. This point is considered to be a point at which the round-trip Gouy phase shift θt reaches 3π/2.

The point at which the multi-mode occurs in FIG. 4 or the change point of the slope is the excitation light power in which θt=3π/2 in FIG. 2, and it is suggested that a thermal lens having the focal length f of approximately 20 mm is formed in the laser medium 13. By further increasing the excitation light power from the point at which θt=3π/2, the equation θt≠2π×n/m is satisfied, the transverse mode is recovered, and light conversion efficiency is improved.

Figure 5:
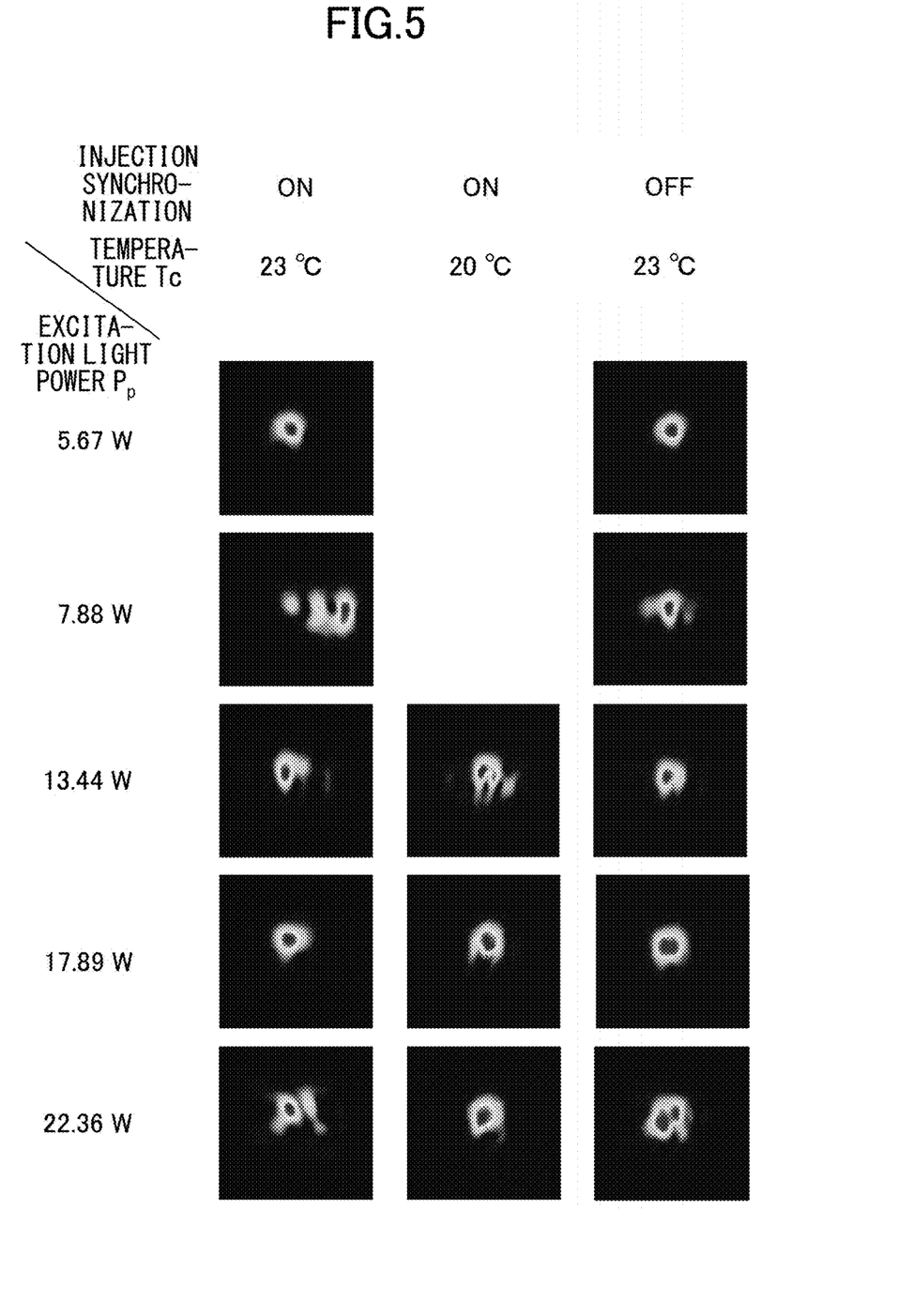
FIG. 5 is a diagram illustrating a change in a transverse mode due to presence or absence of injection synchronization, the excitation light power, and the temperature of a crystal holder.

FIG. 5 is images obtained by the camera 61 installed near the light resonator 63 under the same three conditions as those in FIG. 4. The excitation light power is increased to 5.67 W, 7.88 W, 13.44 W, 17.89 W, and 22.36 W.

When the excitation light power is equal to or less than 7.88 W, a good beam shape is obtained regardless of the presence or absence of injection synchronization at the excitation light power of 5.67 W under a condition in which a holder temperature is 23° C. When the excitation light is increased to 7.88 W, particularly, a beam splits in the transverse direction with the injection synchronization turned on, causing a multi-mode. This means that the round-trip Gouy phase shift θt of the tangential component is 3π/2 and multi-mode oscillation occurs.

When the excitation light power is set to 13.44 W, the beam shape is disturbed in the transverse direction. The beam shape is slightly improved at the same excitation light power and a holder temperature of 23° C., as compared to that when the excitation light power is set to 7.88 W, but deterioration of in the transverse mode still remains. This means that the condition of θt=2π×n/m is satisfied again.

It is suggested from the calculation that θt=11π/7.

When the excitation light power is set to 17.89 W, the beam shape has a clean shape under both of the conditions of the holder temperature of 20° C. and 23° C. When the excitation light power is set to 22.36 W, the beam shape worsens again under the condition of the holder temperature of 23° C., but the beam shape is recovered at the holder temperature of 20° C. This suggests that the condition of θt=2π×n/m is satisfied under the condition of the holder temperature of 23° C., but that focal length is slightly changed when changing the holder temperature to 20° C. and the condition is no longer satisfied.

From the observation results in FIG. 5, it can be seen that transition to the multi-mode can be tuned or recovered by controlling the holder temperature, i.e., the temperature of the laser medium 13. By providing the temperature control mechanism 55, a multi-mode of the round-trip light that passes through the laser medium 13 can be recovered by absorption of the excitation light.

Figure 6:
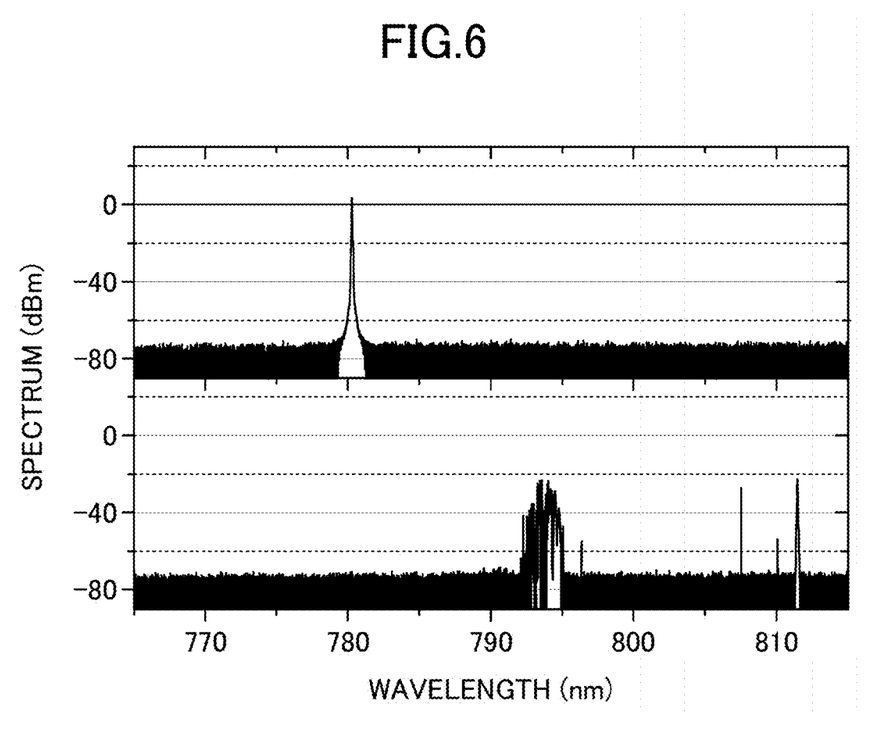
FIG. 6 is a diagram illustrating a result of measurement performed by a light spectrum analyzer.

FIG. 6 illustrates a measurement result of the light spectrum analyzer 51. The top half of FIG. 5 illustrates a spectrum when the injection synchronization is turned on with 22.5 W excitation, and the bottom half of FIG. 5 illustrates a spectrum when the injection synchronization is turned off with 22.5 W excitation.

The single longitudinal mode is obtained when the injection synchronization is turned on in the top half. The laser output light power at this time is 9.8 W. In the bottom half without the injection synchronization, multi-mode oscillation occurs completely.

Figure 7:
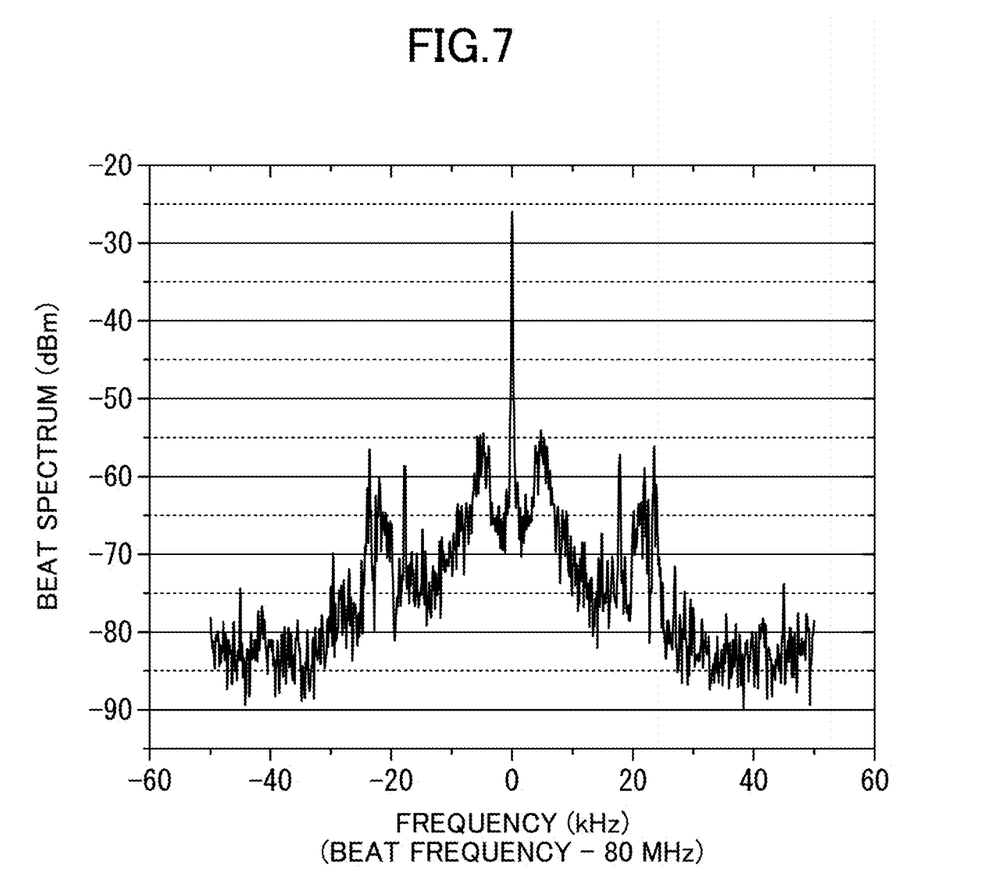
FIG. 7 is a diagram illustrating a result of beat measurement of laser output light and seed light performed by an electrical spectrum analyzer.

FIG. 7 illustrates a beat measurement result of laser output light and seed light. The beat measurement result is measured by the electrical spectrum analyzer 52 in FIG. 3. FIG. 7 illustrates the beat measurement result when the spectrum in the top half in FIG. 6 is observed in a narrower range. It can be seen that line width is sufficiently thin and the mode of the seed light is highly powered without degrading.

Figure 8:
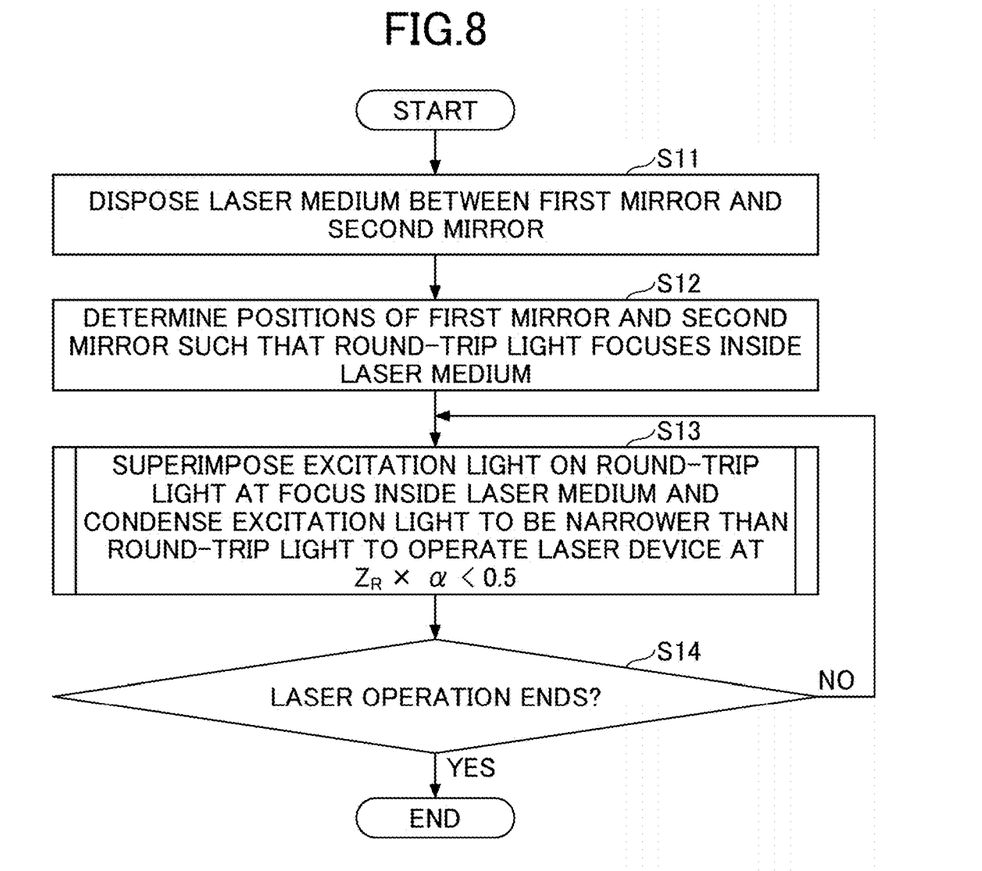
FIG. 8 is a flowchart of a method for operating a laser device according to the embodiment.

FIG. 8 is a flowchart of a method for operating the laser device 10. The laser medium 13 is disposed between the first mirror 111 and the second mirror 112 each having the recessed surface in the progressive type resonator 11 (S11). Positions of the first mirror 111 and the second mirror 112 are determined such that the round-trip light that travels in round trips in the resonator 11 has a focus inside the laser medium 13 (S12). The positions at which the first mirror 111, the second mirror 112, and the laser medium 13 are disposed are determined based on a radius of curvature of the first mirror 111, a radius of curvature of the second mirror 112, the effective length L of the laser medium 13, and the like. Here, the absorption coefficient α and L of the laser medium 13 with respect to the excitation light satisfy a relationship of L×α>1.89.

The excitation light is superimposed on the round-trip light at the focus in the laser medium 13, and the excitation light is condensed to be narrower than the round-trip light to operate the laser device 10 at $Z_R×α<0.5$ (S13). Diffusion of the excitation light superimposed on the round-trip light is reduced by the effect of the thermal lens formed in the laser medium 13, and the slope efficiency is improved. The laser output operation in step S13 continues until the operation of the laser device 10 ends (Yes in S14).

Figure 9:
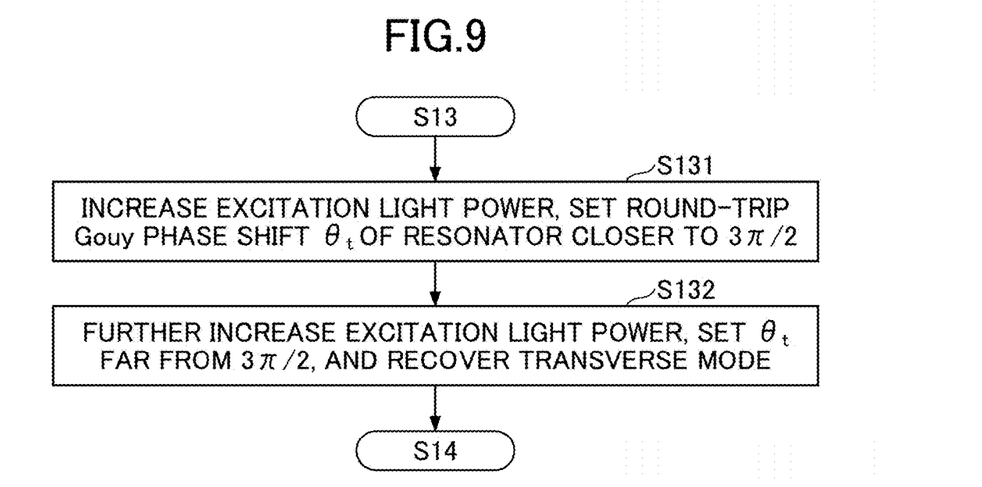
FIG. 9 is a flowchart of transverse mode recovery when an excitation light beam is condensed.

FIG. 9 is a flowchart of step S13 in FIG. 8. The power of the excitation light is increased from 0 to be set closer to θt=3π/2 of the resonator 11 (S131). The power of the excitation light is further increased from a point at which θt=3π/2, and θt is further increased (S132). The excitation light power may be fixed at a point at which θt≠2π×n/m. Here, it is sufficient to consider m of up to 14. Further, the temperature of the laser medium 13 or the excitation light power may be controlled such that the round-trip Gouy phase shift θt does not become 2π×n/m (where m is an integer less than 15 and n is an integer equal to or less than m), and multi-mode oscillation occurring due to the round-trip light that passes through the laser medium 13 may be avoided. Such control allows for obtaining the laser device having high light conversion efficiency.

As described above, a method for operating the laser device 10 includes forming the resonator 11 of a traveling wave type by the plurality of mirrors including the first mirror 111 and the second mirror 112, disposing the laser medium 13 between the first mirror 111 and the second mirror 112, determining positions of the first mirror 111 and the second mirror 112 such that round-trip light that travels in round trips in the resonator 11 has a focus inside the laser medium 13, causing excitation light to be incident on the resonator 11, superimposing the excitation light on the round-trip light at the focus inside the laser medium 13, and narrowing the excitation light to be thinner than the round-trip light, and performing control such that a round-trip Gouy phase shift of the resonator 11 does not become 2π×n/m (where m is an integer of less than 15 and n is an integer of equal to or less than m), where the laser device is configured to operate under a condition of $Z_R×α<0.5$, where a Rayleigh length of the excitation light is $Z_R$ and an absorption coefficient of the light by the laser medium 13 with respect to the excitation light is α.

In a more preferable example, L×α>1.89 and $Z_R×α<0.5$ when an effective length of the laser medium 13 with respect to the excitation light is L.

As described above, the excitation light is condensed by the thermal lens generated in the laser medium 13. The power of the excitation light is increased, the focal length of the thermal lens is shortened, and the round-trip Gouy phase shift of the resonator 11 is set closer to 3π/2. The power of the excitation light is further increased, the focal length of the thermal lens is further shortened, and the round-trip Gouy phase shift is further increased from 3π/2. With this configuration, the slope efficiency is improved. A temperature of the laser medium 13 or the excitation light power is controlled such that the round-trip Gouy phase shift θ does not become 2π×n/m (where m is an integer less than 15 and n is an integer equal to or less than m), and thus multi-mode oscillation of the round-trip light can be suppressed.

The present invention is not limited to the examples described above. The Rayleigh length $Z_R$ of the excitation light and the absorption coefficient α of the laser medium with respect to the excitation light are appropriately selected in a range that satisfies L×α>1.89 and $Z_R×α<0.5$. The resonator 11 is configured with an appropriate arrangement according to a radius of curvature of the recessed mirror to be used, the size of the laser medium, and the like. A wavelength of the excitation light and a wavelength of the seed light are selected according to the laser output light as a target. In all of the cases, a laser device having higher light conversion efficiency than that of a conventional configuration can be achieved.

What is claimed is:

1. A laser device comprising:
   a traveling wave type resonator comprising a first mirror and a second mirror; and
   a laser medium disposed between the first mirror and the second mirror, wherein:
   the first mirror and the second mirror are disposed such that round-trip light that travels in round trips in the resonator has a focus inside the laser medium;
   the laser device is configured such that:
   excitation light incident on the resonator is superimposed on the round-trip light at the focus and narrowed to be thinner than the round-trip light,
   $Z_R \times \alpha < 0.5$ is satisfied, where $Z_R$ is a Rayleigh length of the excitation light and a is an absorption coefficient of the laser medium with respect to the excitation light, and
   a round-trip Gouy phase shift of the resonator has a value excluding $2\pi \times n/m$ where m is an integer of less than 15 and n is an integer of equal to or less than m.

2. The laser device according to claim 1, wherein:
   $L \times \alpha > 1.89$ is satisfied where L is an effective length of the laser medium with respect to the excitation light.

3. The laser device according to claim 1, wherein:
   the laser device comprises a temperature control mechanism configured to control a temperature of the laser medium.

4. The laser device according to claim 3, wherein:
   the temperature control mechanism includes a holder configured to hold the laser medium, and a temperature adjuster configured to adjust a temperature of the holder.

5. The laser device according to claim 3, wherein:
   the temperature control mechanism is configured to cause, by absorption of the excitation light, recovery of a multi-mode of the round-trip light that passes through the laser medium.

6. The laser device according to claim 1, wherein:
   the laser device further comprises
   a seed light source configured to cause seed light to be incident on the resonator; and
   a longitudinal mode adjustment circuit configured to control a resonator length of the resonator to be integer times a wavelength of the seed light.

7. The laser device according to claim 1, wherein:
   a slope efficiency of the laser device, represented by a ratio of an output light power increment with respect to an excitation light power increment, is higher in a second power region in which an excitation light power is higher than a predetermined level compared to a first power region in which the excitation light power is equal to or less than the predetermined level.

8. The laser device according to claim 7, wherein:
   the slope efficiency in the first power region is equal to or greater than 30% and less than 40%.

9. The laser device according to claim 7, wherein:
   the slope efficiency in the second power region is in a range of 45% to 60%.

10. A method for operating a laser device, the method comprising:
    providing a traveling wave type resonator comprising a first mirror and a second mirror, and a laser medium between the first mirror and the second mirror, wherein the first mirror and the second mirror are disposed such that round-trip light that travels in round trips in the resonator has a focus inside the laser medium;
    causing excitation light to be incident on the resonator such that the excitation light is superimposed on the round-trip light at the focus and narrowed to be thinner than the round-trip light; and
    performing control such that:
    a round-trip Gouy phase shift of the resonator has a value excluding $2\pi \times n/m$, where m is an integer of less than 15 and n is an integer of equal to or less than m, and
    $Z_R \times \alpha < 0.5$ is satisfied where a Rayleigh length of the excitation light is $Z_R$ and an absorption coefficient of the laser medium with respect to the excitation light is $\alpha$.

11. The method for operating a laser device according to claim 10, wherein:
    the laser device operates under a condition of $L \times \alpha > 1.89$, where L is an effective length of the laser medium with respect to the excitation light.

12. The method for operating a laser device according to claim 10, further comprising:
    condensing the excitation light by a thermal lens generated in the laser medium.

13. The method for operating a laser device according to claim 12, further comprising:
    increasing power of the excitation light, shortening a focal length of the thermal lens, and setting a round-trip Gouy phase shift of the resonator closer to $3\pi/2$; and
    further increasing the power of the excitation light, shortening the focal length of the thermal lens, and further increasing the round-trip Gouy phase shift from $3\pi/2$.

* * * * *